（12） United States Patent
Chhabra et al.

(10) Patent No.: US 9,930,033 B2
(45) Date of Patent: Mar. 27, 2018

(54) ON DEMAND PASSWORDS

(71) Applicant: Yahoo! Inc., Sunnyvale, CA (US)

(72) Inventors: Lovlesh Chhabra, San Ramon, CA (US); Dylan Casey, Sunnyvale, CA (US); Atte Lahtiranta, Cupertino, CA (US); Jonathan Edward Hryn, Cary, NC (US); Alice Francine Gutman, Mountain View, CA (US)

(73) Assignee: Oath Inc., New York, NY (US)

( * ) Notice: Subject to any disclaimer, the term of this patent is extended or adjusted under 35 U.S.C. 154(b) by 60 days.

(21) Appl. No.: 14/956,224

(22) Filed: Dec. 1, 2015

(65) Prior Publication Data

US 2016/0269398 A1    Sep. 15, 2016

Related U.S. Application Data

(60) Provisional application No. 62/133,189, filed on Mar. 13, 2015.

(51) Int. Cl.
*H04L 29/06* (2006.01)
*H04L 29/08* (2006.01)

(52) U.S. Cl.
CPC ........ *H04L 63/0838* (2013.01); *H04L 63/083* (2013.01); *H04L 63/0846* (2013.01); *H04L 63/20* (2013.01); *H04L 67/02* (2013.01)

(58) Field of Classification Search
CPC ... H04L 63/08; H04L 63/083; H04L 63/0838; H04L 63/20; H04L 67/02
USPC ............................. 726/2–8; 713/168; 380/44
See application file for complete search history.

(56) References Cited

U.S. PATENT DOCUMENTS

| 8,402,362 | B2 * | 3/2013 | Boss ..................... G06F 17/243 |
| | | | 713/183 |
| 8,438,635 | B2 * | 5/2013 | Das ..................... H04L 63/0838 |
| | | | 713/151 |
| 8,590,022 | B2 * | 11/2013 | Faryna ..................... G06F 21/35 |
| | | | 455/411 |
| 8,776,194 | B2 * | 7/2014 | Hitchcock ............. G06F 21/335 |
| | | | 726/6 |
| 8,819,795 | B2 * | 8/2014 | Hitchcock ............... G06F 21/41 |
| | | | 726/17 |
| 9,400,884 | B2 * | 7/2016 | Boss ..................... G06F 17/243 |
| 2004/0181696 | A1 | 9/2004 | Walker |
| 2005/0015604 | A1 | 1/2005 | Sundararajan et al. |
| 2013/0086655 | A1 | 4/2013 | Karp |
| 2013/0254856 | A1 | 9/2013 | Krishan |

OTHER PUBLICATIONS

Gordon, Whitson, "Here's everywhere you should enable two-factor authentication right now," Lifehacker, Dec. 10, 2013, downloaded from http://lifehacker.com/5938565/heres-everywhere-you-should-enable-two-factor-authentication-right-now?utm_expid=66866090-68.hhyw_lmCRuCTCg0I2RHHtw.0&utm_referrer=http%3A%2F%2Flifehackcr.com%2F5938565%2Fheres-everywhere-you-should-enable-two-factor-authentication-right-now.
WO patent application No. PCT/US2016/020750, International Search Report and Written Opinion dated Jun. 3, 2016.

* cited by examiner

*Primary Examiner* — Hosuk Song
(74) *Attorney, Agent, or Firm* — Weaver Austin Villeneuve & Sampson LLP

(57) ABSTRACT

In one embodiment, a user password is received in relation to a user identifier, wherein the user identifier and user password are associated with a user account. A request to opt-in to use of system-generated passwords instead of the user password is received. A substitute password for the user account is generated and provided.

21 Claims, 13 Drawing Sheets

ON DEMAND PASSWORDS

RELATED APPLICATIONS

This application claims priority of U.S. Provisional Application No. 62/133,189, entitled "On Demand Passwords," by Chhabra et al., filed on Mar. 13, 2015, which is incorporated herein by reference in its entirety and for all purposes.

BACKGROUND

The disclosed embodiments relate generally to computer-implemented methods and apparatus for implementing on demand system-generated passwords associated with user accounts.

To gain access to resources of a computer system, an individual is often required to complete a login procedure. In some instances, the computer system may include a remote computer. Resources offered by a computer system may include, for example, data, applications, or various services offered by the computer system.

During the login process, the computer system typically identifies and authenticates an individual. Generally, authentication is performed using a password submitted by the individual. For example, a web site may provide a login page that enables the individual to submit a password to successfully log in to the web site.

A password is typically a word or string of characters used for user authentication to prove identity or access approval to gain access to a resource offered by a computer system. Generally, an individual selects the password that the computer system will use to authenticate the individual during subsequent login processes.

SUMMARY

In one embodiment, a user password may be received in relation to a user identifier, wherein the user identifier and user password are associated with a user account. A request to opt-in to use of system-generated passwords instead of the user password may be received. A substitute password for the user account may be generated and provided.

In another embodiment, a device comprising a processor and a memory is configured to perform one or more of the above described method operations. In another embodiment, a computer readable storage medium having computer program instructions stored thereon are arranged to perform one or more of the above described method operations.

DETAILED DESCRIPTION OF THE SPECIFIC EMBODIMENTS

Figure 1:
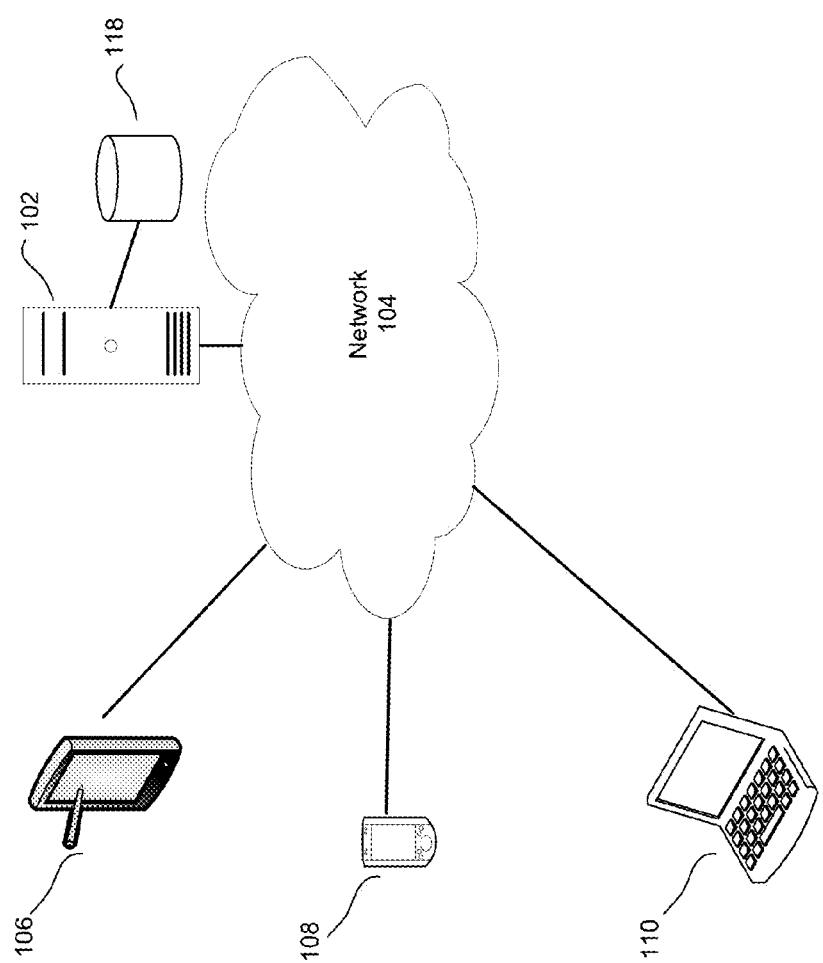
FIG. 1 is a diagram illustrating an example system in which various embodiments may be implemented.

Reference will now be made in detail to specific embodiments of the disclosure. Examples of these embodiments are illustrated in the accompanying drawings. While the disclosure will be described in conjunction with these specific embodiments, it will be understood that it is not intended to limit the disclosure to these embodiments. On the contrary, it is intended to cover alternatives, modifications, and equivalents as may be included within the spirit and scope of the disclosure as defined by the appended claims. In the following description, numerous specific details are set forth in order to provide a thorough understanding of the disclosure. The disclosed embodiments may be practiced without some or all of these specific details. In other instances, well known process operations have not been described in detail in order not to unnecessarily obscure the disclosure. The Detailed Description is not intended as an extensive or detailed discussion of known concepts, and as such, details that are known generally to those of ordinary skill in the relevant art may have been omitted or may be handled in summary fashion Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments support the generation and use of on demand system-generated passwords for user accounts. More particularly, an on demand password feature may be enabled or disabled in response to a user action. In addition, an on demand system-generated password may be requested in response to a user action.

In some embodiments, a user action may include interaction with a system-provided indication (e.g., menu, icon, button, or hypertext link) or submission of a user-initiated request. For example, the user action may include selecting or activating an icon, button, or hypertext link using an input device (e.g., clicking on the indication using a mouse) or interacting with a touch screen of a client device (e.g., tapping on the system provided indication). As another example, the user action may include using a voice command or sending a short message service (sms) message.

According to various embodiments, a computer system may support the use of on demand system generated passwords. More particularly, the system may provide an option to enroll in on demand password services to users having user accounts with the system. In some embodiments, on demand password services may be provided as an option for all user accounts. In other embodiments, the ability to opt-in to on demand password services may be made available to a subset of user accounts maintained by the system.

Typically, an individual may submit a user password in association with a user identifier at the time that a user account is established. In addition, the user password may be changed upon submission of a new user password to the system. For example, a user password may be submitted to the system in association with the user identifier via a graphical user interface.

To obtain access to the user account, a user may log in to the user account by submitting his or her user identifier and user password via a graphical user interface. Once logged in to the user account, the user may access information in the user account, access content or services provided by the web site, or receive various services such as personalized content from the system. In many instances, the user account provides access to valuable personal information such as credit card numbers or the user's social security number.

Individuals often have multiple user accounts across a number of systems. For example, these systems may be associated with phone companies, banks, email systems, etc. As a result, the individuals have to keep track of the passwords associated with all of their user accounts. To make it easier to remember their passwords, individuals often re-use the same password across various systems.

Today, individuals have the ability to access their accounts from different locations. More particularly, most individuals own mobile devices such as tablets, laptops, or cellular phones, increasing the likelihood that they will access unsecured wireless networks. In addition, individuals may access their accounts from computing devices other than their own when they are not at home. For example, individuals might access their friends' computing devices or airport kiosks when they are traveling. Therefore, there are many opportunities for user information submitted during the login process to be compromised.

In the event that a hacker has intercepted or captured the username and password of a user during the login process, they may gain access to valuable personal information of the user via the corresponding user account. In addition, where the user has used the same password for other accounts, the security of his or her other accounts may also be comprised.

Some systems offer additional security by using a two-tier authentication operation. For example, once a user has submitted their user identifier and password, such systems may generate and provide a further code via email to be submitted by the user to successfully log in to their user account. While such systems may provide additional security, this is a more time-consuming process. As a result, the user may be less motivated to return to access their account to use the system. Furthermore, the user still has to keep track of their password to successfully complete the log in process. Accordingly, there fails to be a secure mechanism that enables users to efficiently log in to their accounts that eliminates the need for users to remember their passwords for their accounts.

The disclosed embodiments support the use of system generated passwords, providing users an efficient and secure mechanism for accessing their accounts without the need to remember passwords for their accounts. Examples of systems and methods for implementing the disclosed embodiments will be described in further detail below.

Example System

FIG. 1 is a diagram illustrating an example system in which various embodiments may be implemented. As shown in FIG. 1, the system may include one or more servers 102. For example, the servers 102 may be associated with a web site that provides a variety of services to its users. More particularly, the server(s) 102 may include a web server, search server, and/or content server.

In accordance with various embodiments, users may access various services offered by the computer system by logging in to their user accounts. Such services may include on demand password services that support the implementation of on demand system-generated passwords. Various methods of providing various on demand password services will be described in further detail below.

In some embodiments, the server(s) 102 may provide services such as targeted content to users of the web site. A content server may store content for presentation to users. For example, a content server may store web pages available on the Internet or data gathered via the Internet. As another example, a content server may be an "ad server" that stores online advertisements for presentation to users. "Ad serving" refers to methods used to place online advertisements on websites, in applications, or other places where users are more likely to see them, such as during an online session.

As shown in FIG. 1, a plurality of clients 106, 108, 110 may log in to their user accounts via the web site to access their accounts, purchase products, or access/receive various services offered to account holders by the web site. Such services may include on demand password services. In some embodiments, the services may include the transmission of personalized content to the clients 106, 108, 110. In other embodiments, the services may include email or other messaging services.

Services may be provided to the clients 106, 108, 110 via applications implemented by the servers 102 and/or the clients 106, 108, 110. The clients 106, 108, 110 may access a web service, for example, on a web server via network 104 using a graphical user interface. In some embodiments, the clients 106, 108, 110 may access a search application on a search server via network 104.

The network 104 may take any suitable form, such as a wide area network or Internet and/or one or more local area networks (LAN's). The network 104 may include any suitable number and type of devices, e.g., routers and switches, for forwarding search or web object requests from each client to the search or web application and search or web results back to the requesting clients.

The disclosed embodiments may also be practiced in a wide variety of network environments (represented by network 104) including, for example, TCP/IP-based networks, telecommunications networks, wireless networks, etc. In addition, computer program instructions with which various embodiments may be implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

A system supporting various on demand password services may be implemented on any number of servers although only a single server 102 is illustrated for clarity. Various embodiments disclosed herein may be implemented via the server 102 and/or the clients 106, 108, 110. For example, various features may be implemented via a web browser and/or application on the clients 106, 108, 110. The disclosed embodiments may be implemented via software and/or hardware.

As will be described in further detail below, the server(s) 102 may provide on demand password services to users including the generation and transmission of on demand system-generated passwords. More particularly, on demand password services may enable users to opt-in to use on demand system-generated passwords instead of their current user password. In addition, on demand password services may include the generation and transmission of system-generated passwords by the server 102 to the clients 106, 108, 110 on an on demand basis in response to requests, which may be received from the clients 106, 108, 110 or other devices.

Users that are members of the web site, access content or other services of the web site, or receive services such as personalized content from the web site may have user accounts that are maintained by the system. In accordance with various embodiments, the server(s) 102 may have access to one or more databases into which account information is retained for each of a plurality of user accounts. The databases may be retained in one or more memories 118 that are coupled to the server 102.

The account information pertaining to a user account may include a user identifier. The user identifier may uniquely identify an account owner (e.g., user) within the system. For example, the user identifier may include a sequence of alphanumeric characters such as a social security number, a phone number, a family name (e.g., Lovlesh Chhabra), a username (e.g., Lovlesh408), or an email address. In accordance with various embodiments, the user identifier is a username that corresponds to an email address associated with the user account. In other embodiments, the user identifier may be determined using other mechanisms. For example, a user may be identified using biometric authentication methods such as a deoxyribonucleic acid (DNA), retina scan, finger print recognition, or facial recognition. As another example, a user may be identified using a possession factor device such as a universal serial bus (USB) security token, near field communication (NFC) device, or smart card.

In addition, the account information may include one or more passwords. More particularly, the account information may include a user password previously established by a user and/or an on demand password. In addition, the account information may indicate whether on demand password services are active (e.g., as a result of opt-in by a user). In other words, the account information may indicate whether a user specified user password and/or on demand password is currently active. The account information may also indicate the time that the last on demand password was requested, generated, transmitted, or otherwise activated. In addition, the account information may indicate the amount of time that an active on demand password remains active.

In accordance with various embodiments, the account information may also include device information pertaining to the client device(s) previously accessed in association with the user account. For example, the device information may include an IP address, MAC address, browser identifier, and/or geographic location from which the corresponding client device was accessed. The account information may also indicate the number of times or frequency with which the devices or corresponding locations were accessed in association with the user account.

In some embodiments, the account information may further include personal information such as demographic information (e.g., birth date, age, occupation, and/or gender) and/or geographic information (e.g., residence address, work address, zip code, and/or area code). The account information may also include credit card information, enabling account owners to be charged for various products or services offered by the web site.

In addition, each time a user performs online activities such as logging in to the web site, opting in to use on demand password services, submitting a password request, performing a search, clicking on a web page or an advertisement, or purchasing goods or services, information regarding such activity or activities may be retained in user logs. For instance, the user data that is retained in the user logs may indicate the identity of web sites visited, identity of ads that have been selected (e.g., clicked on), client device information (e.g., browser identifier, IP address, and/or MAC address), geographic location of the client device, and/or a timestamp.

Figure 2:
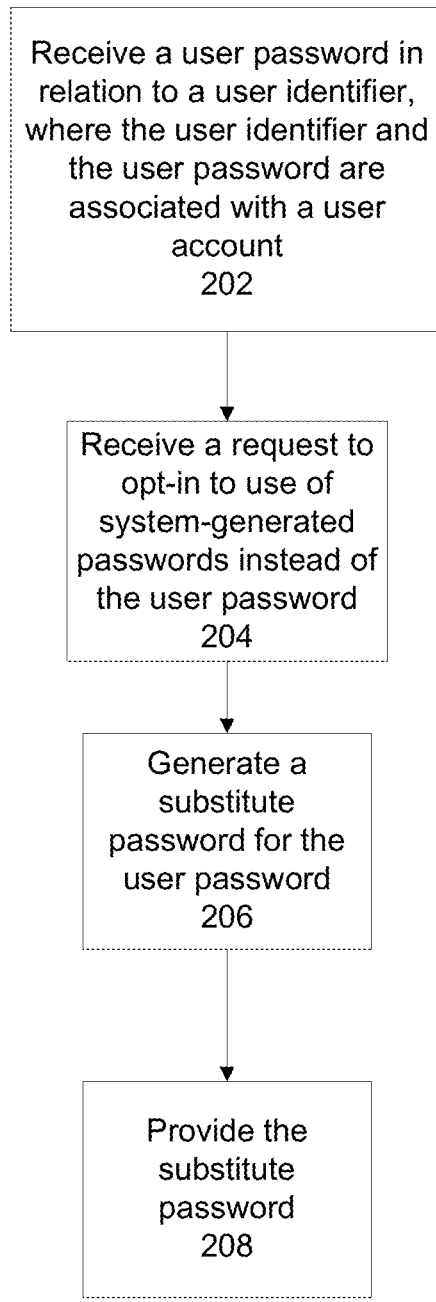
FIG. 2 is a process flow diagram illustrating an example process of implementing on demand system-generated passwords in accordance with various embodiments.

FIG. 2 is a process flow diagram illustrating an example method of implementing on demand system-generated passwords. As shown in FIG. 2, the system may receive a user password in relation to a user identifier associated with a user account at 202. More particularly, the user password may be submitted to the system via a graphical user interface presented via a web page. The user may also enter the user identifier in a corresponding input box of the graphical user interface. Alternatively, the user identifier or portion thereof may be presented in the corresponding input box of the graphical user interface without receiving input from the user. For example, the user password may be submitted via a login page that displays the user identifier or portion thereof.

Once a successful login process is completed, access to the user account may be provided. For example, at least a portion of the account information associated with the user account may be modified. In addition, the system may provide a variety of services to a client device via which the user password was submitted to the system in relation to the user identifier. For example, personalized services, which may include content such as news articles or advertisements, may be provided to the client device.

The user may remain signed in to his or her user account for future sessions. Alternatively, the system may log the user out of his or her user account to increase the security associated with on demand password services provided by the system. In one embodiment, the system default is to keep the user signed in. In another embodiment, the system default is to keep the user signed out. The user may modify the system default, as desired.

According to various embodiments, a user may opt in or out of the use of on demand system-generated passwords. For example, an on demand password option may be selected by submitting an opt-in request.

The system may receive a request to opt-in to use of system-generated passwords instead of the current user password at 204. More particularly, an opt-in option may be accessed by the user via a particular web page of the web site. In some embodiments, a graphical user interface may present one or more selectable options to the user, enabling the user to opt-in or opt-out of the use of on demand system-generated passwords. For example, each of the selectable options may be accessed or presented via a menu, icon, button, hypertext link, or other selectable input feature.

In some embodiments, the user may indicate the mechanism by which that they would like to receive system generated passwords and associated messages. For example, the user may indicate by performing a user action (e.g., clicking on one of a set of available options) that they would like to receive system generated passwords via text or email. In other embodiments, the system may support a single mechanism (e.g., either email or sms messages) via which the user may receive system generated passwords and/or associated messages.

In addition, in accordance with various embodiments, the user may submit specific contact information via which the user would like to receive on demand passwords in conjunction with opting in to use system-generated passwords. For example, the user may enter a mobile phone number at the time of opting in to use on demand passwords. Thus, the account information maintained by the system may include specific contact information (e.g., a mobile phone number) that is used for the transmission of on demand system generated passwords to the owner of the user account, as well as general contact information (e.g., an email address). The specific contact information may also be used for the transmission of additional messages pertaining to system-generated passwords to the owner of the user account. By using specific information rather than general contact information, the system may reduce the likelihood that other individuals will capture or intercept system-generated passwords that have been transmitted by the system.

In some embodiments, the system may obtain confirmation of the opt-in request prior to enabling (e.g., activating) on demand password use for the user account and/or disabling the use of the current user password for the user account. More particularly, the system may transmit a notification of the opt-in request using contact information associated with the user account. An account owner may approve or decline the opt-in request for the user account.

Upon receiving the request to opt-in to use of system-generated passwords or a subsequent confirmation of the request by the account owner, the system may update the account information pertaining to the user account such that the user account is not accessible via the current user password. For example, the system may set an opt-in flag in the user account information to indicate that the user has opted-in to receive system-generated passwords. In some embodiments, the system may delete the user password from the account information so that it can no longer be used to access the user account. In other embodiments, the system may deactivate the user password so that the user account cannot be accessed using the user password during the time that the user is opted-in to use on demand system-generated passwords. Deactivation of the user password may be performed, for example, by setting the opt-in flag in the account information associated with the user account.

The system may generate and provide passwords on demand. In accordance with various embodiments, an on demand password may be requested by a user for a user account by submitting a password request. A password request may be submitted to the system via user interaction with a system-generated indication such as a button, icon, or hypertext link. For example, such an indication may be presented via a web page, sms message, or email message. Alternatively, the password request may be transmitted upon initiation of the user. Example mechanisms for submitting a password request include, but are not limited to, interaction with an input device or touch screen of a mobile device. In some embodiments, the previously received request to opt in to use of system generated passwords may serve as a password request.

A password request may be submitted while a previous password for the user account is still active. In addition, a password request may be submitted after the previous password for the user account has expired. In some embodiments, this may be accomplished by submitting the previous expired password to request a new on demand password from the system. In other embodiments, after an on demand password has expired, the system defaults to use of a previously deactivated user password that was active at the time of submission of an opt-in request.

A password request to initiate on demand password generation may be received via various client devices and locations. Thus, in accordance with various embodiments, the system may determine whether a password request was received from the owner of the user account. Such verification may be performed using the account information and/or other information such as that pertaining to the client device that sent the password request. The information pertaining to the client device may include, for example, a geographic location of the client device, Internet Protocol (IP) address of the client device, web browser, and/or Media Access Control (MAC) address of the client device. For example, if the owner of the user account has previously logged in via the same client device (e.g., IP address and/or MAC address), the system may determine that the password has been received from the owner of the user account.

In some implementations, the system limits the number of password requests that may be submitted in association with a user account within a period of time (e.g., minutes, hours, or days). For example, the system may limit the number of password requests that may be submitted in association with the user account to 10 requests within a 24 hour period. The system may impose this limit in situations where the system is not confident that password requests are being received from the owner of the user account. More particularly, the system may determine whether a password request is received from a device and/or location via which the user account has previously been accessed (e.g., via log in or via password requests). For example, the system may determine whether it recognizes the Internet Protocol (IP) address, Media Access Control (MAC) address, web browser, and/or geographic location of the device in association with the user account. Where the system recognizes the geographic location as being one that the account owner frequently visits, the system may choose not to impose this limit. In this manner, the system may increase the security associated with the transmission and use of on demand passwords. Furthermore, the system may reduce the likelihood that an individual abuses the use of password requests to the detriment of the account owner. For example, where the system sends a notification in response to each password request, this may become irritating to an account owner who has shared their password with another individual.

The system may transmit a notification message to an owner of the user account via the user contact information (e.g., general contact information or password-specific contact information). For example, the notification message may include a push notification, flash notification, sms message, an email, a vibration of their mobile device, or a sound (e.g., beep) transmitted via their mobile device. In some instances, a notification message may serve to notify the owner of the account that they have opted in to use system-generated passwords instead of their current user password, thereby informing them their account will no longer be accessible via their user password. In other instances, a notification may serve to notify the owner of the account that the system has received an opt-in request, and may request further confirmation by the owner of the account of the intent of the account owner to opt-in to use of system-generated passwords instead of their current user password. The account owner may decline or approve an opt-in request. For example, the notification message may include a code that the user may use to confirm that they have received the notification and approve of the opt-in request. In yet other instances, a notification message may notify the owner of the account that a password request has been received. In some embodiments, the notification message may include the pertinent contact information for confirmation by the owner of the user account.

The system may wait to proceed with updating account information and/or on demand password generation until it receives a confirmation from the owner of the user account in response to a notification message sent by the system. More particularly, the system may obtain confirmation from the owner of the user account that the account owner has received the notification and, therefore, the contact information (e.g., previously provided in association with opting in to use system-generated passwords) for on demand password generation is correct. In some instances, the system may obtain confirmation from the owner of the account that they would like to opt in to receive system-generated passwords before updating the account information to deactivate or delete the user password. For example, the system may send a sms message to a mobile phone number specified in the account information to confirm that the owner of the user account is in possession of the mobile device having the mobile phone number. Confirmation may be received via a user action such as sending a reply sms message, clicking on a hypertext link provided in a web page or provided in an email message, providing a code via a web page or other suitable mechanism, or interacting with a touch screen (e.g., tapping the screen) of the mobile device.

For example, the system may transmit a push notification of receipt of an opt-in request for use of on demand password services to a mobile device of the account owner. The account owner may tap a touch-screen display of their mobile device. The mobile device may then present a web page including a graphical user interface that enables the user to approve or decline the request to which the notification pertains. The user may approve the request, for example, by submitting a code (received in the notification) via the graphical user interface.

The system may generate and transmit a newly generated substitute password for use in accessing the user account or associated services and update the account information to include the newly generated password, as will be described in further detail below. More particularly, the system may generate a substitute password for the user account, transmit the substitute password, and/or update the account information with the substitute password after or in response to one or more of the following: an opt-in to the use of system-generated passwords for the user account, receiving a password request for the user account, receiving a confirmation from the owner of the user account, and/or verification by the system that a password request has been received from the owner of the user account.

The system may generate a substitute password for the user account at 206. The substitute password may be generated using a password generator. More particularly, the password generator may randomly select a sequence of alphanumeric characters. For example, the system may use a random number generator. The system may store the newly generated substitute password in the account information corresponding to the user account such that the substitute password may be used instead of the current (e.g., prior or most recent) user password. The user account and associated services may subsequently be accessed via the substitute password. In accordance with various embodiments, the substitute password may be generated in response to receiving a password request such as that described above.

In some embodiments, the system may generate the substitute password based, at least in part, on the likelihood that the password request was received from the owner of the user account. Where it is unlikely that the password was received from the owner of the user account, there is greater concern that the password is a malicious attack by an individual attempting to impersonate the owner of a user account (e.g., using the IP address, email address, or mobile phone number associated with the user account). In these instances, the system may generate a substitute password of greater length and/or complexity to reduce the chance that hackers will be able to accurately identify the substitute password (which will serve as the new user password) and gain access to the user account. Alternatively, where it is likely that the password request was received from the owner of the user account, the system may generate a substitute password of shorter length and/or complexity.

The likelihood that the password request was received from the owner of the user account may be ascertained by a decision engine of the system using the account information, the number of accounts associated with the client device, and/or other information such as that pertaining to the client device that sent the password request. Thus, the decision engine may determine whether providing a substitute password in response to the password request would present a security risk. For example, if the account owner has not previously logged in via the same client device (e.g., IP address and/or MAC address) or geographic location, the decision engine may determine that it is less likely that the password request was received from the owner of the user account. As another example, where the decision engine ascertains that the client device that sent the password request has at least a threshold number of system accounts, the decision engine may determine that responding to the password request with a substitute password would result in a risky log in. In this manner, a decision engine may balance security against the convenience of the user.

The system may provide the substitute password at 208. The system may transmit the substitute password via the user contact information associated with the user account. For example, the substitute password may be transmitted via email, push notification, or sms message. As described above, in some implementations, the contact information via which the substitute password is transmitted may be specified or selected by the user in conjunction with opting in to receiving system-generated passwords. Alternatively, the substitute password may be transmitted via general contact information (e.g., an email address, mobile phone number, etc.) maintained in the account information associated with the user account.

In accordance with various embodiments, the substitute password may be a temporary password that is valid for a particular period of time (e.g., minutes or hours) after generating or providing the substitute password. For example, the system may be configured with the particular period of time. As a result, the substitute password may no longer be valid after expiration of the period of time. In one embodiment, the substitute password may be used to log in to the user account any number of times during the period of time. In another embodiment, the substitute password may be used a limited number of times during the time period. The system may deactivate the substitute password upon expiration of the period of time (e.g., by deleting the substitute password from account information or unsetting a corresponding flag). Alternatively, the system may determine whether the period of time has passed upon receiving the user identifier and substitute (new) password.

Once the system has transmitted the substitute password, the user may use the substitute password to log in to the user account. In some embodiments, the user may submit the substitute password (new user password) via a web page that is presented after submission of the password request. In other embodiments, the user may submit the substitute password via a login web page. More particularly, the login web page may be accessed via the client device from which the on demand password was requested or another client device. The user identifier may be entered by the user. Alternatively, the user identifier or portion thereof may be presented by the system in the login web page (e.g. upon recognition of the client device by the system). Therefore, the user may log in to the user account using the substitute password via the client device or another client device.

Upon receiving the substitute password in association with the user identifier for the user account, the system may determine whether the substitute password is still active. For example, the system may ascertain whether the substitute password that has been submitted matches that in the account information for the user account. The system may provide access to the user account and associated services according to whether the substitute password is still active. For example, if the period of time has expired, the system may deny access to the user account and associated services. By limiting the period of time during which the substitute period is active, the system may provide additional security associated with the use of system-generated passwords.

The system may perform authentication for the session using the substitute password that has been entered in association with the user identifier. After the login is successfully completed, the system may provide access to the user account and any associated services (e.g., without receiving a further access code). Accordingly, the disclosed embodiments may support the authentication during login to a user account using a single factor of authentication.

The user may subsequently choose to opt out of the use of on demand system-generated passwords. In some embodiments, the system may reactivate a previously deactivated password (e.g., by modifying a corresponding flag in the account information). In this manner, the system may enable the user to use their previous user password. The system may present a success dialog and/or transmit a notification to inform the user that they have successfully opted out of using system-generated passwords.

Figure 3A:
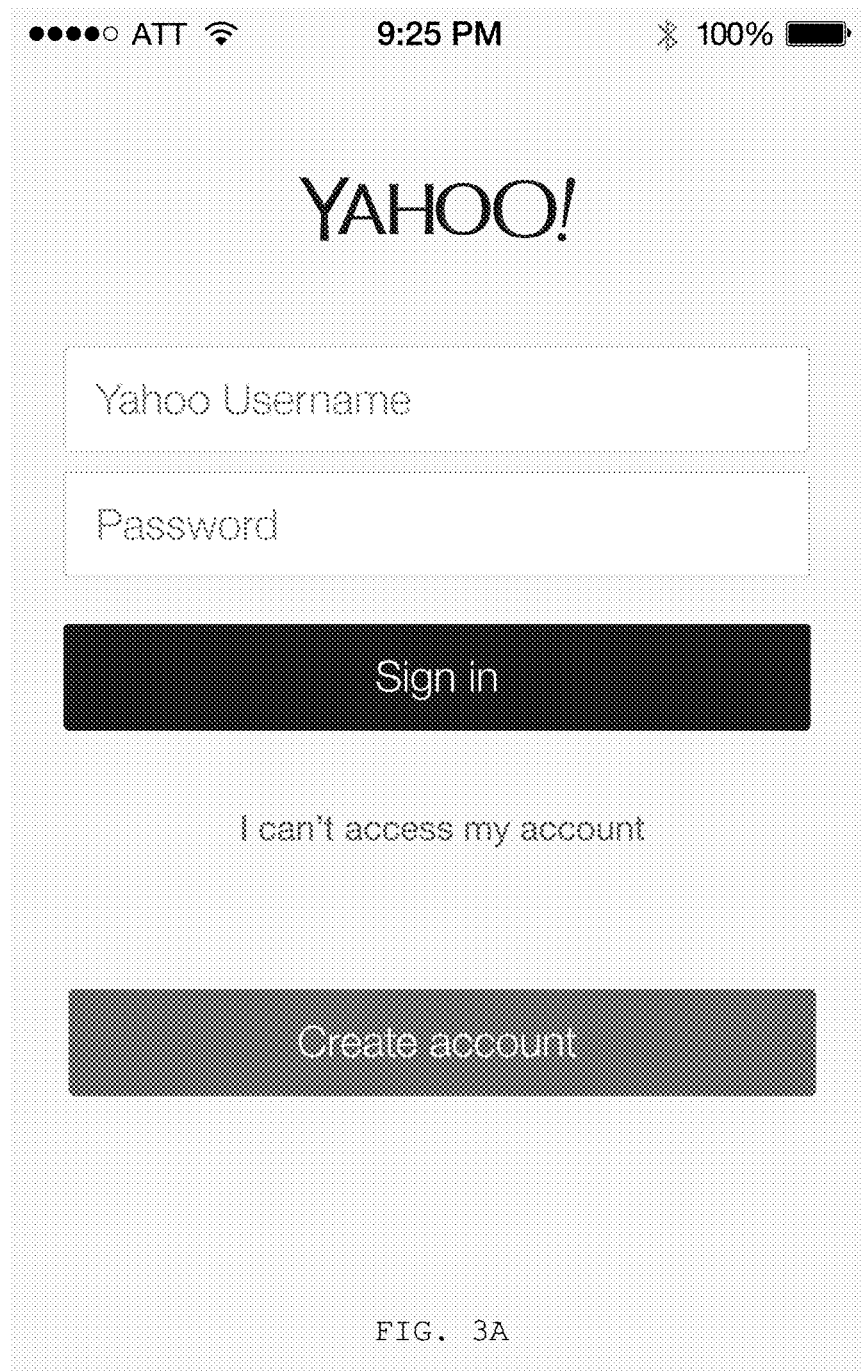
FIGS. 3A-3H are screen shots illustrating example graphical user interfaces that may be presented to facilitate log in to a user account in accordance with various embodiments.

FIGS. 3A-3H are screen shots illustrating example graphical user interfaces that may be presented to facilitate log in to a user account in accordance with various embodiments. As shown in FIG. 3A, a login web page may be provided by the web site when the user accesses a home page of the web site. The login web page may provide an option to "Keep me signed in." (Not shown to simplify illustration.)

Figure 3B:
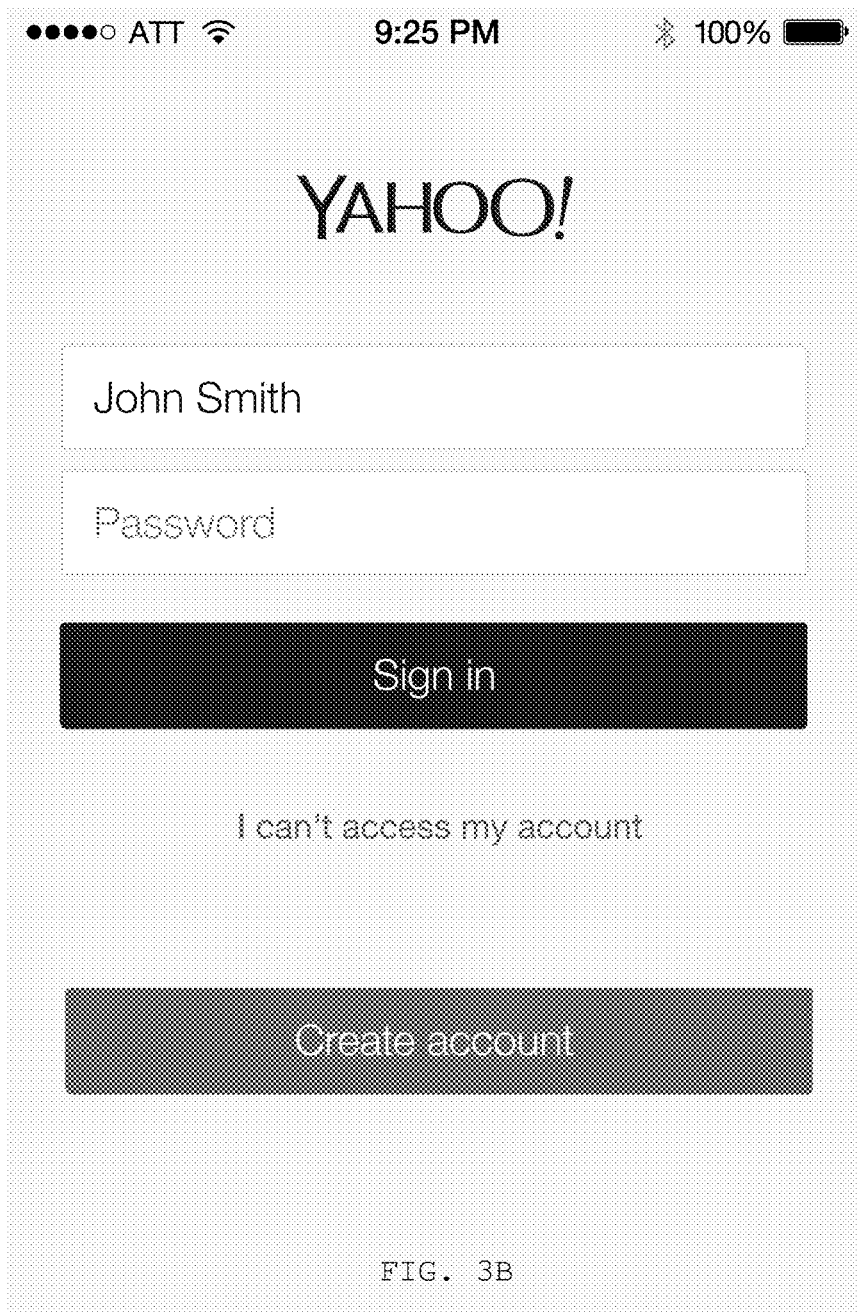

The user may enter their user identifier (e.g., username), as shown in FIG. 3B. Alternatively, the user identifier may be provided by the system when the user accesses the log in web page (e.g., where the system recognizes the client device used by the user).

The user may opt-in to use of on demand passwords instead of their user password, as described above. When the user chooses to use on demand password services, the user may specify or indicate the contact number (or email address) to be used to transmit on demand passwords to the user.

Figure 3C:
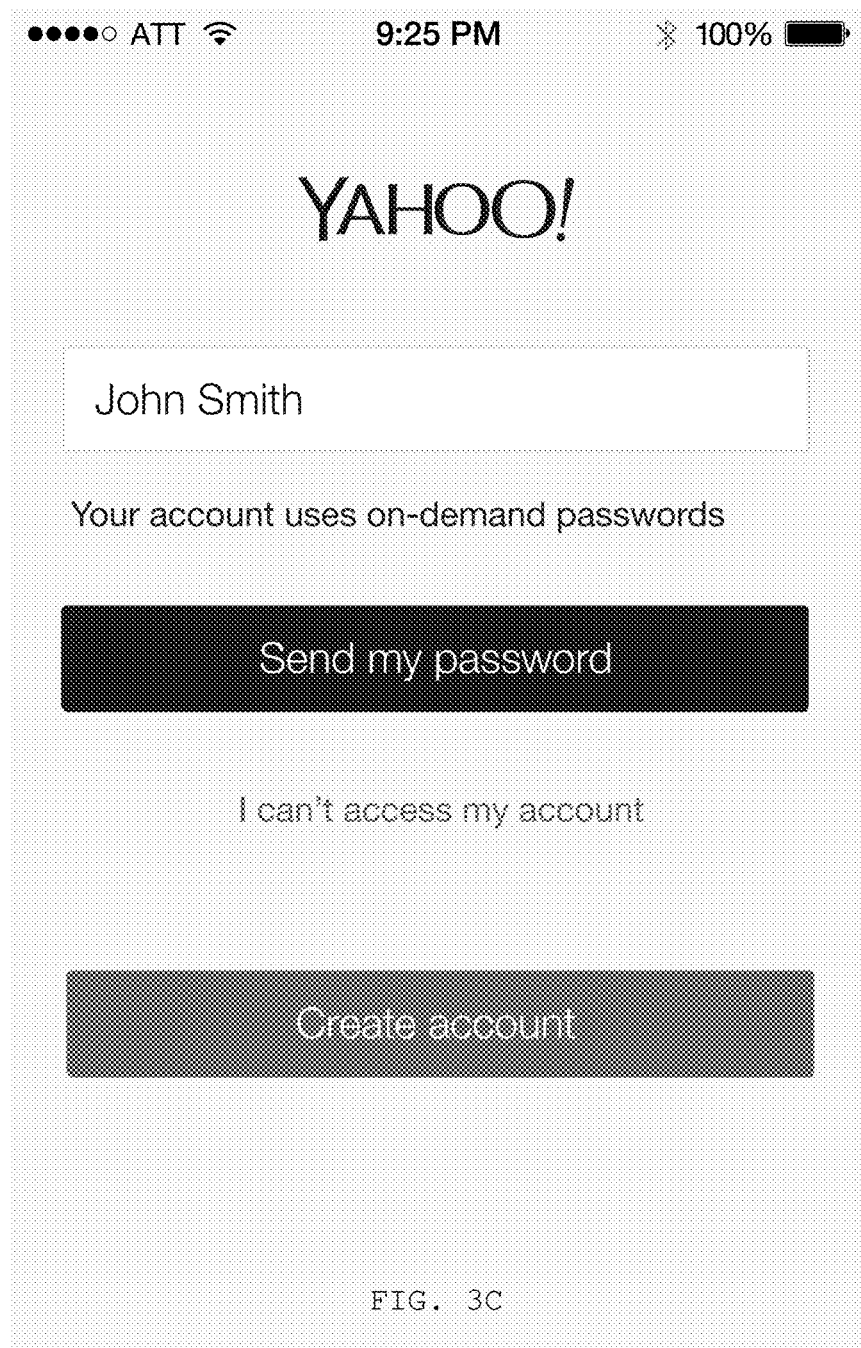

Upon returning to the login web page, shown in FIG. 3C, the system may provide a message notifying the user that their account uses on demand passwords. In some embodiments, the system may provide such a message when the user attempts to enter characters in the "Password" input box of the login web page. The user may request an on demand password by submitting a password request. In some embodiments, the login web page may provide an input features such as a button that enables a password request for the user identifier to be submitted to the system. In this example, the web page presents a "Send my password" button that may be clicked or otherwise selected by the user.

Figure 3D:
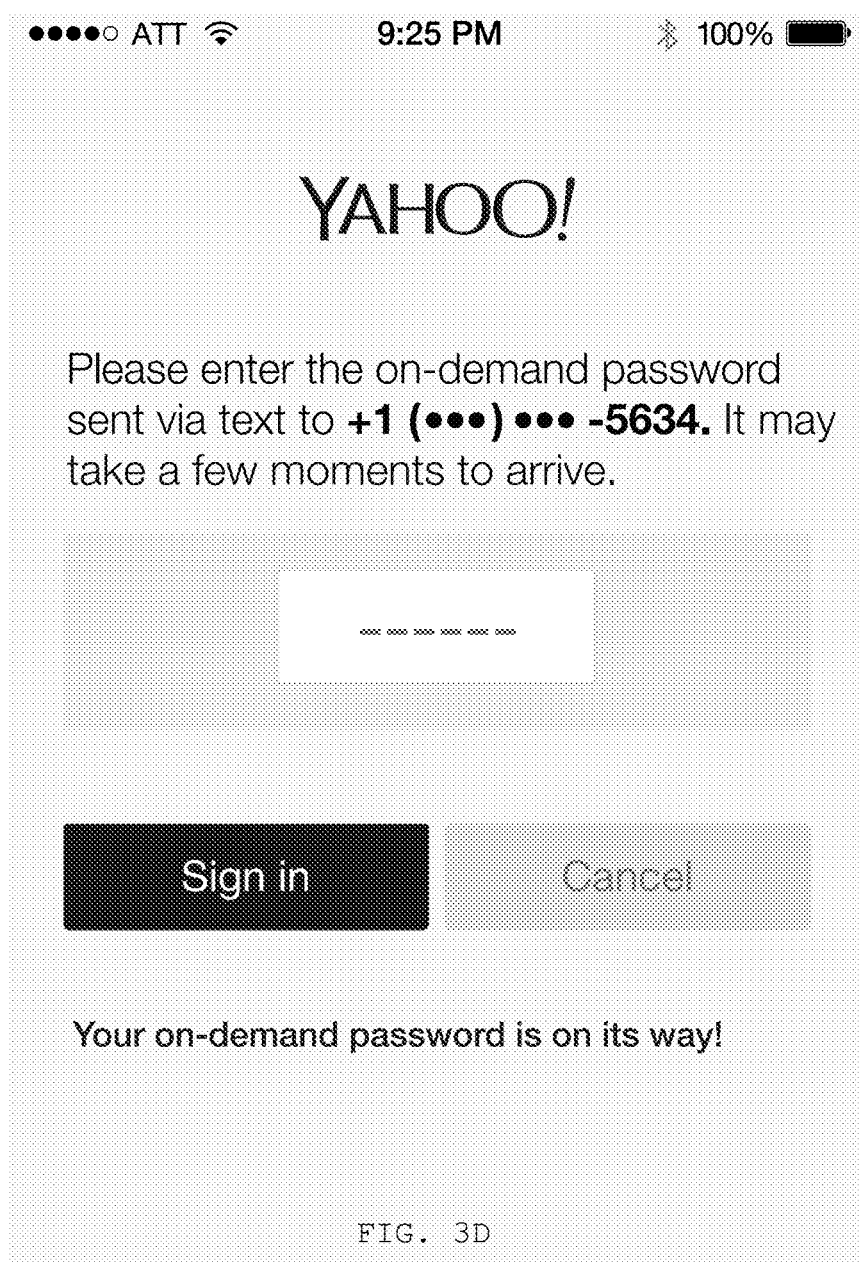
Figure 3E:
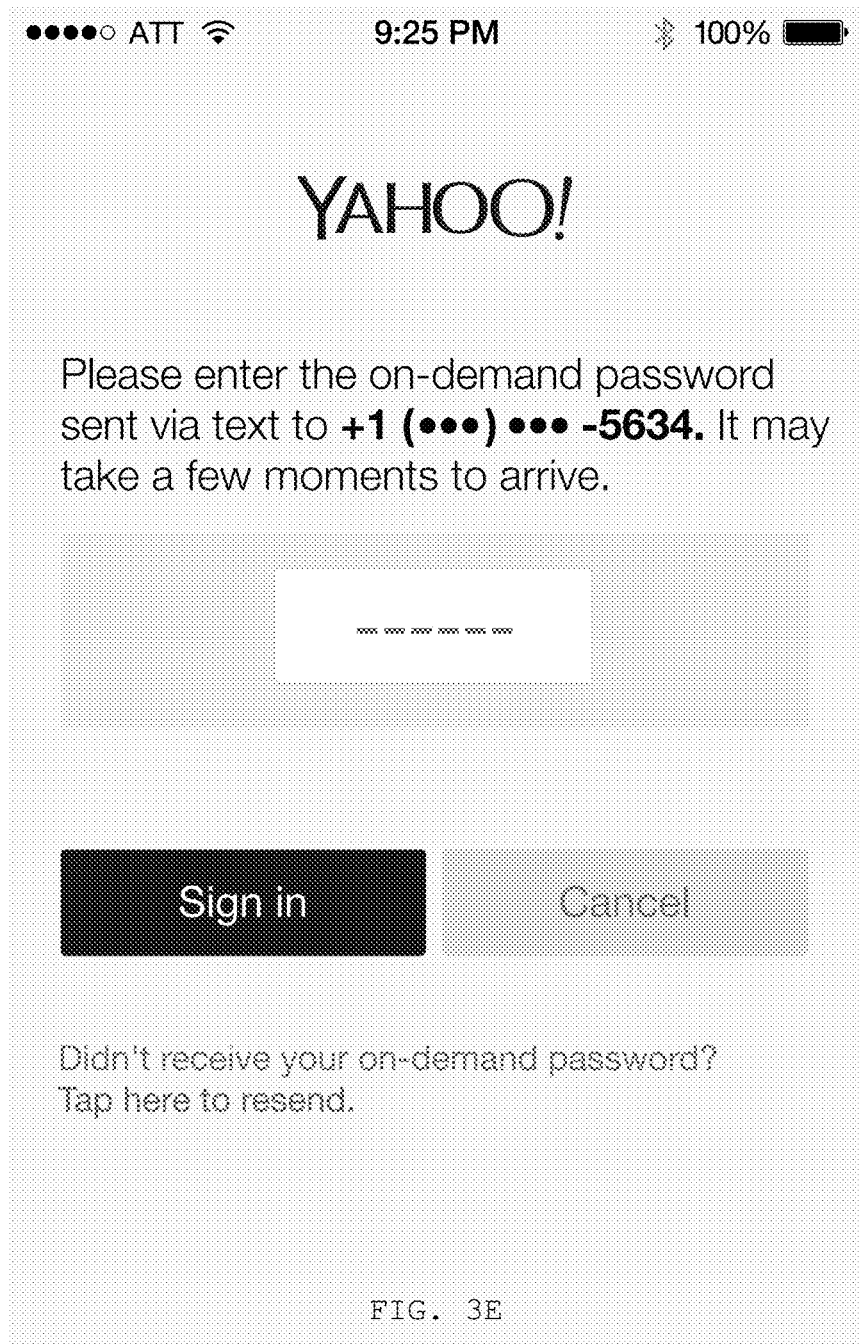

FIG. 3D illustrates an example graphical user interface that may be provided by the system via the client device in response to the submission of a password request. More particularly, the graphical user interface of FIG. 3D may provide a message indicating that the on demand password has been sent. In addition, the graphical user interface may provide an input feature for submission of the on demand password to the system. The graphical user interface may also indicate the manner in which the on demand password was transmitted. As shown in this example, the graphical user interface may provide a message notifying the user that the on demand password was sent via text and identify the mobile phone number that was used to transmit the text message. Thus, the message provided by the system via a graphical user interface may facilitate retrieval of the on demand password by the user.

The system may provide an option for requesting that the system resend the on demand password to the user. For example, a graphical user interface may provide a button such as that shown in FIG. 3E that enables the user to request that the system resend the on demand password. The graphical user interface may also provide an option for requesting that the system generate and send a new on demand password to the user. This may be desirable, for example, where the previous on demand password sent to the user has expired.

Figure 3F:
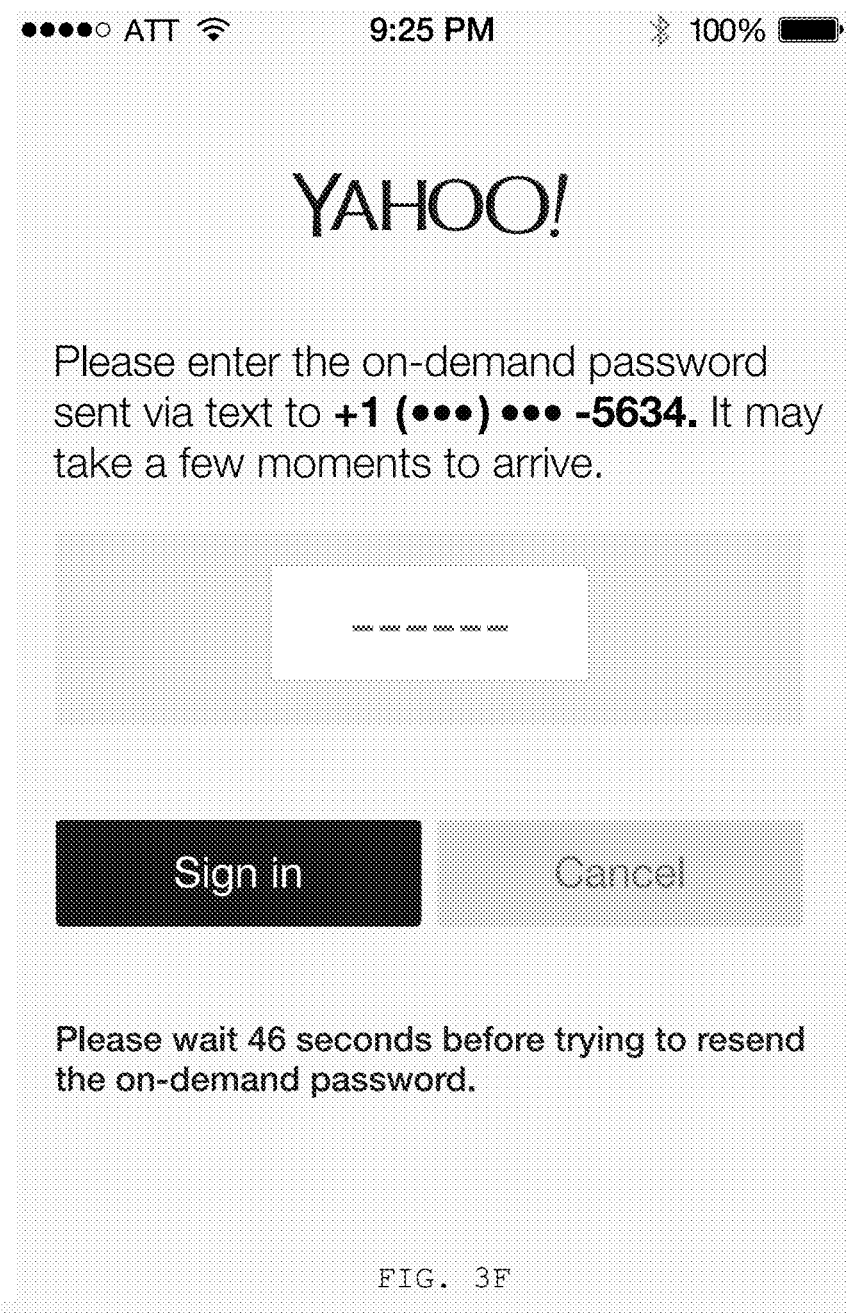

In some embodiments, a graphical user interface such as that shown in FIG. 3F may request that the user wait a particular period of time before trying to request that the system resend the on demand password or a new on demand password.

Upon receipt of the on demand password, the user may use the on demand password to log in to the user account.

Figure 3G:
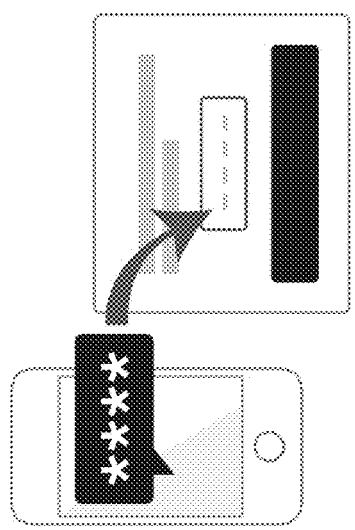

For example, the user may receive a text message including the on demand password and enter the on demand password via the input feature, as shown in FIG. 3G.

Figure 3H:
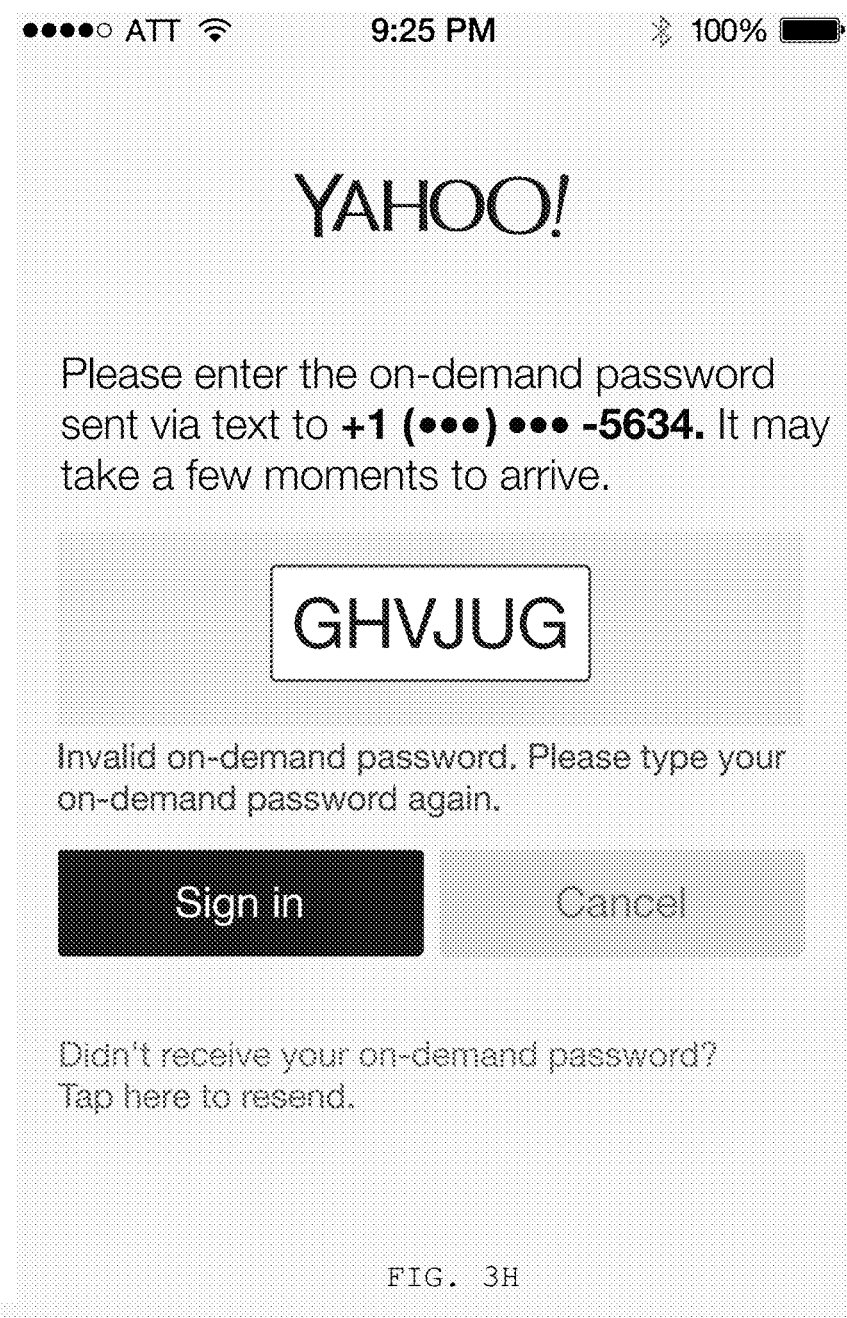

The user may enter the on demand password to log in to the user account, as shown in FIG. 3H. If the user enters the incorrect password, the user may attempt to submit the on demand password again.

In the example described above, the input feature via which the on demand password is submitted is presented via a web page that is separate from the login page. However, in accordance with other embodiments, the on demand password may be submitted via a login web page such as that shown and described with reference to FIGS. 3A-3C. Thus, the web page via which an on demand password is submitted may also display the user identifier. Alternatively, the system may obfuscate the user identifier that is presented. For example, the user identifier may be concealed, at least in part, on client devices that the user is using for the first time (e.g., in association with the user account). In this manner, the system may protect the user's identifier from being displayed publicly during the login process.

Network

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

Content Distribution Network

A distributed system may include a content distribution network. A "content delivery network" or "content distribution network" (CDN) generally refers to a distributed content delivery system that comprises a collection of computers or computing devices linked by a network or networks. A CDN may employ software, systems, protocols or techniques to facilitate various services, such as storage, caching, communication of content, or streaming media or applications. Services may also make use of ancillary technologies including, but not limited to, "cloud computing," distributed storage, DNS request handling, provisioning, signal monitoring and reporting, content targeting, personalization, or business intelligence. A CDN may also enable an entity to operate or manage another's site infrastructure, in whole or in part.

Peer-to-Peer Network

A peer-to-peer (or P2P) network may employ computing power or bandwidth of network participants in contrast with a network that may employ dedicated devices, such as dedicated servers, for example; however, some networks may employ both as well as other approaches. A P2P network may typically be used for coupling nodes via an ad hoc arrangement or configuration. A peer-to-peer network may employ some nodes capable of operating as both a "client" and a "server."

Wireless Network

A wireless network may couple client devices with a network. A wireless network may employ stand-alone ad-hoc networks, mesh networks, Wireless LAN (WLAN) networks, cellular networks, or the like.

A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth, 802.11b/g/n, or the like. A wireless network may include virtually any type of wireless communication mechanism by which signals may be communicated between devices, such as a client device or a computing device, between or within a network, or the like.

Internet Protocol

Signal packets communicated via a network, such as a network of participating digital communication networks, may be compatible with or compliant with one or more protocols. Signaling formats or protocols employed may include, for example, TCP/IP, UDP, DECnet, NetBEUI, IPX, Appletalk, or the like. Versions of the Internet Protocol (IP) may include IPv4 or IPv6.

The Internet refers to a decentralized global network of networks. The Internet includes LANs, WANs, wireless networks, or long haul public networks that, for example, allow signal packets to be communicated between LANs. Signal packets may be communicated between nodes of a network, such as, for example, to one or more sites employing a local network address. A signal packet may, for example, be communicated over the Internet from a user site via an access node coupled to the Internet. Likewise, a signal packet may be forwarded via network nodes to a target site coupled to the network via a network access node, for example. A signal packet communicated via the Internet may, for example, be routed via a path of gateways, servers, etc. that may route the signal packet in accordance with a target address and availability of a network path to the target address.

Network Architecture

Figure 4:
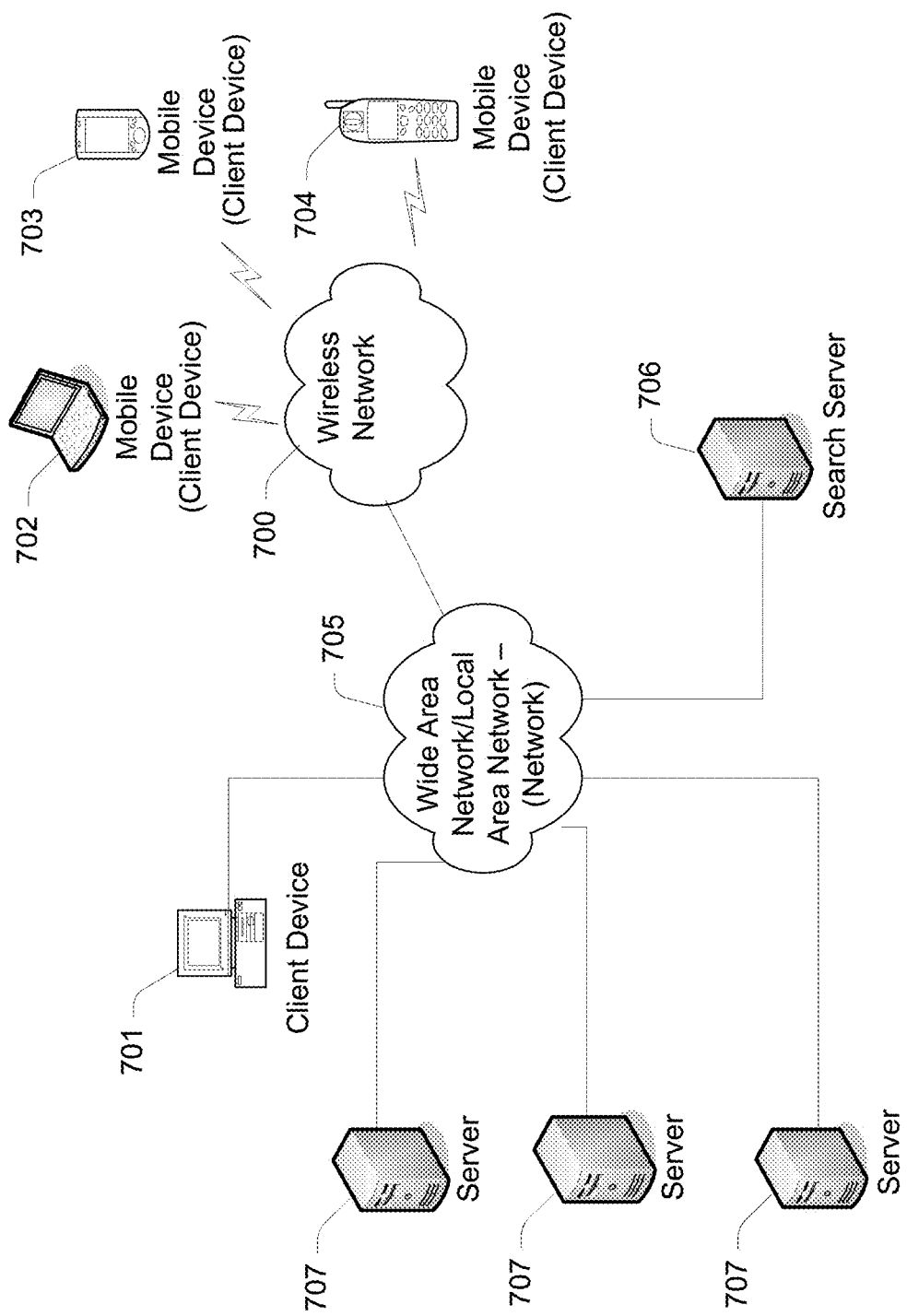
FIG. 4 is a schematic diagram illustrating an example embodiment of a network in which various embodiments may be implemented.

The disclosed embodiments may be implemented in any of a wide variety of computing contexts. FIG. 4 is a schematic diagram illustrating an example embodiment of a network. Other embodiments that may vary, for example, in terms of arrangement or in terms of type of components, are also intended to be included within claimed subject matter. Implementations are contemplated in which users interact with a diverse network environment. As shown, FIG. 4, for example, includes a variety of networks, such as a LAN/WAN 705 and wireless network 700, a variety of devices, such as client devices 701-704, and a variety of servers such as content server(s) 707 and search server 706. The servers may also include an ad server (not shown). As shown in this example, the client devices 701-704 may include one or more mobile devices 702, 703, 704. Client device(s) 701-704 may be implemented, for example, via any type of computer (e.g., desktop, laptop, tablet, etc.), media computing platforms (e.g., cable and satellite set top boxes), handheld computing devices (e.g., PDAs), cell phones, or any other type of computing or communication platform.

Figure 5:
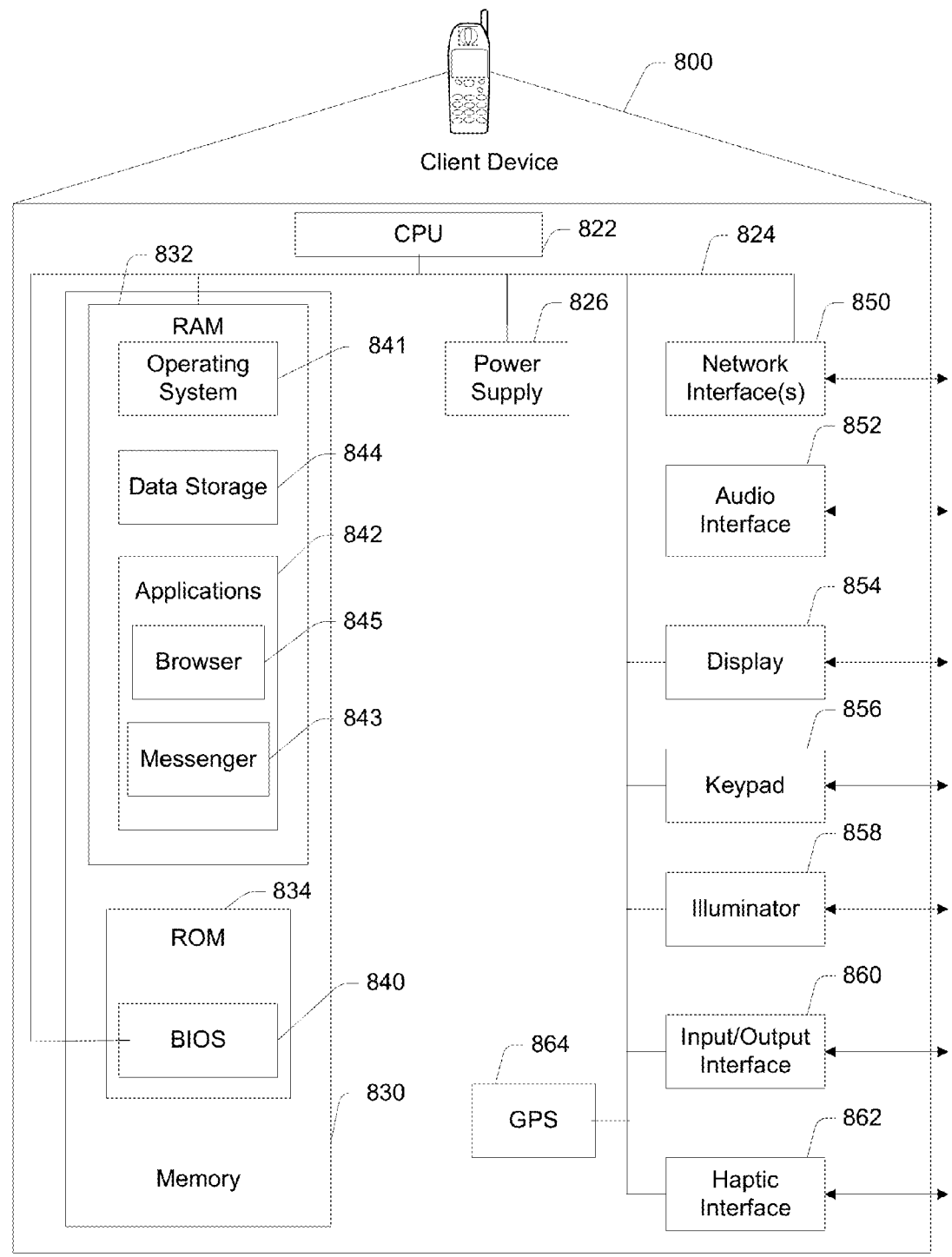
FIG. 5 is a schematic diagram illustrating an example client device in which various embodiments may be implemented.

The disclosed embodiments may be implemented in some centralized manner. This is represented in FIG. 5 by server(s) 707, which may correspond to multiple distributed devices and data store(s). The server(s) 707 and/or corresponding data store(s) may store user account data, user information, and/or content.

Server

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like.

Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Content Server

A content server may comprise a device that includes a configuration to provide content via a network to another device. A content server may, for example, host a site, such as a social networking site, examples of which may include, without limitation, Flicker, Twitter, Facebook, LinkedIn, or a personal user site (such as a blog, vlog, online dating site, etc.). A content server may also host a variety of other sites, including, but not limited to business sites, educational sites, dictionary sites, encyclopedia sites, wikis, financial sites, government sites, etc.

A content server may further provide a variety of services that include, but are not limited to, web services, third-party services, audio services, video services, email services, instant messaging (IM) services, SMS services, MMS services, FTP services, voice over IP (VOIP) services, calendaring services, photo services, or the like. Examples of content may include text, images, audio, video, or the like, which may be processed in the form of physical signals, such as electrical signals, for example, or may be stored in memory, as physical states, for example.

Examples of devices that may operate as a content server include desktop computers, multiprocessor systems, microprocessor-type or programmable consumer electronics, etc.

Client Device

FIG. 5 is a schematic diagram illustrating an example embodiment of a client device in which various embodiments may be implemented. A client device may include a computing device capable of sending or receiving signals, such as via a wired or a wireless network. A client device may, for example, include a desktop computer or a portable device, such as a cellular telephone, a smart phone, a display pager, a radio frequency (RF) device, an infrared (IR) device, a Personal Digital Assistant (PDA), a handheld computer, a tablet computer, a laptop computer, a set top box, a wearable computer, an integrated device combining various features, such as features of the forgoing devices, or the like. A portable device may also be referred to as a mobile device or handheld device.

As shown in this example, a client device 800 may include one or more central processing units (CPUs) 822, which may be coupled via connection 824 to a power supply 826 and a memory 830. The memory 830 may include random access memory (RAM) 832 and read only memory (ROM) 834. The ROM 834 may include a basic input/output system (BIOS) 840.

The RAM 832 may include an operating system 841. More particularly, a client device may include or may execute a variety of operating systems, including a personal computer operating system, such as a Windows, iOS or Linux, or a mobile operating system, such as iOS, Android, or Windows Mobile, or the like. The client device 800 may also include or may execute a variety of possible applications 842 (shown in RAM 832), such as a client software application such as messenger 843, enabling communication with other devices, such as communicating one or more messages, such as via email, short message service (SMS), or multimedia message service (MMS), including via a network, such as a social network, including, for example, Facebook, LinkedIn, Twitter, Flickr, or Google, to provide only a few possible examples. The client device 800 may also include or execute an application to communicate content, such as, for example, textual content, multimedia content, or the like, which may be stored in data storage 844. A client device may also include or execute an application such as a browser 845 to perform a variety of possible tasks, such as browsing, searching, playing various forms of content, including locally stored or streamed video, or games (such as fantasy sports leagues).

The client device 800 may send or receive signals via one or more interface(s). As shown in this example, the client device 800 may include one or more network interfaces 850. The client device 800 may include an audio interface 852. In addition, the client device 800 may include a display 854 and an illuminator 858. The client device 800 may further include an Input/Output interface 860, as well as a Haptic Interface 862 supporting tactile feedback technology.

The client device 800 may vary in terms of capabilities or features. Claimed subject matter is intended to cover a wide range of potential variations. For example, a cell phone may include a keypad such 856 such as a numeric keypad or a display of limited functionality, such as a monochrome liquid crystal display (LCD) for displaying text. In contrast, however, as another example, a web-enabled client device may include one or more physical or virtual keyboards, mass storage, one or more accelerometers, one or more gyroscopes, global positioning system (GPS) 864 or other location identifying type capability, or a display with a high degree of functionality, such as a touch-sensitive color 2D or 3D display, for example. The foregoing is provided to illustrate that claimed subject matter is intended to include a wide range of possible features or capabilities.

According to various embodiments, input may be obtained using a wide variety of techniques. For example, input for downloading or launching an application may be obtained via a graphical user interface from a user's interaction with a local application such as a mobile application on a mobile device, web site or web-based application or service and may be accomplished using any of a variety of well-known mechanisms for obtaining information from a user. However, it should be understood that such methods of obtaining input from a user are merely examples and that input may be obtained in many other ways.

In some embodiments, an identity of the user (e.g., owner) of the client device may be statically configured. Thus, the device may be keyed to an owner or multiple owners. In other embodiments, the device may automatically determine the identity of the user of the device. For instance, a user of the device may be identified by deoxyribonucleic acid (DNA), retina scan, and/or finger print.

Figure 6:
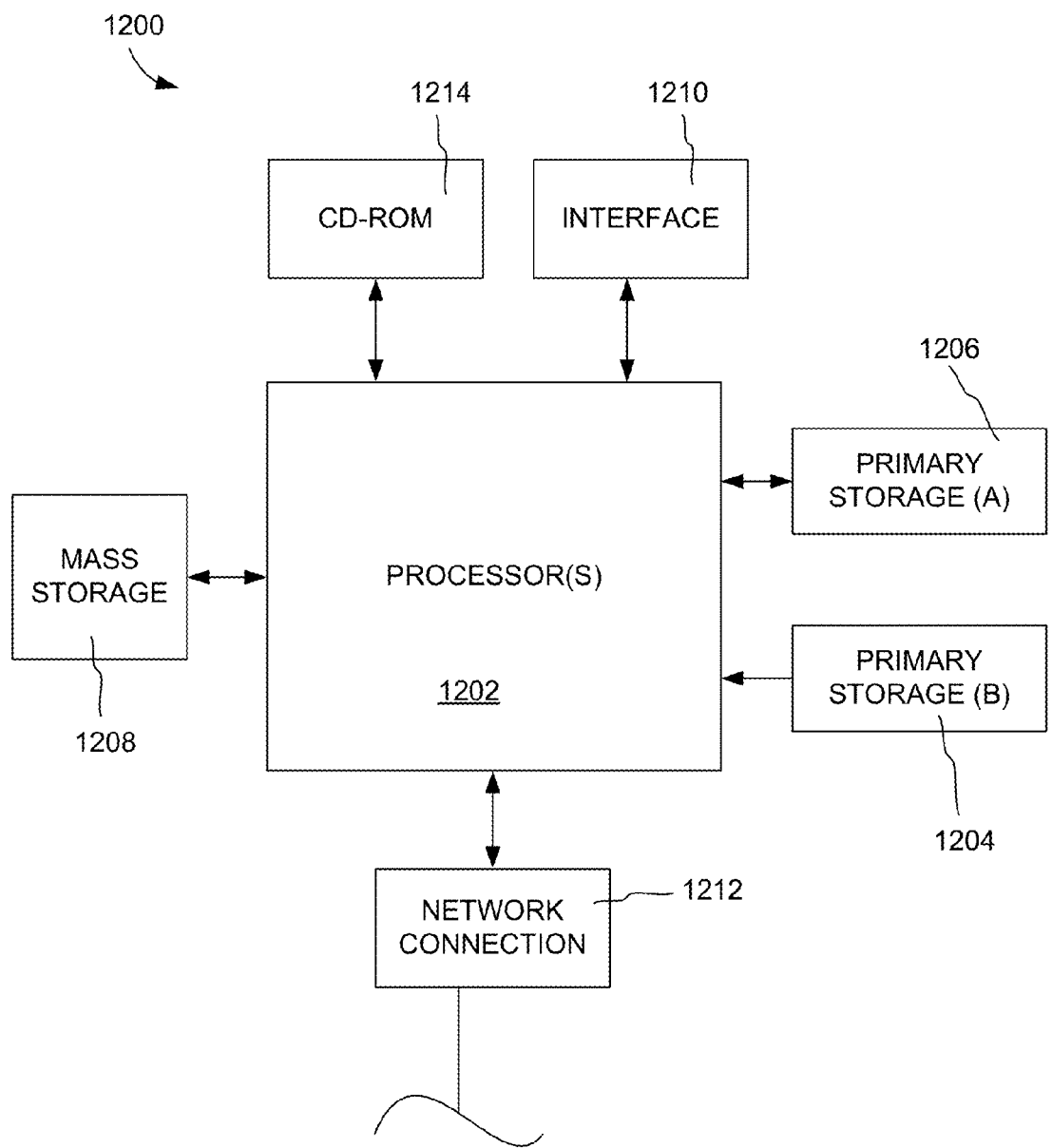
FIG. 6 is a schematic diagram illustrating an example computer system in which various embodiments may be implemented.

FIG. 6 illustrates a typical computer system that, when appropriately configured or designed, can serve as a system via which various embodiments may be implemented. The computer system 1200 includes any number of CPUs 1202 that are coupled to storage devices including primary storage 1206 (typically a RAM), primary storage 1204 (typically a ROM). CPU 1202 may be of various types including microcontrollers and microprocessors such as programmable devices (e.g., CPLDs and FPGAs) and unprogrammable devices such as gate array ASICs or general purpose microprocessors. As is well known in the art, primary storage 1204 acts to transfer data and instructions uni-directionally to the CPU and primary storage 1206 is used typically to transfer data and instructions in a bi-directional manner. Both of these primary storage devices may include any suitable computer-readable media such as those described above. A mass storage device 1208 is also coupled bi-directionally to CPU 1202 and provides additional data storage capacity and may include any of the computer-readable media described above. Mass storage device 1208 may be used to store programs, data and the like and is typically a secondary storage medium such as a hard disk. It will be appreciated that the information retained within the mass storage device 1208, may, in appropriate cases, be incorporated in standard fashion as part of primary storage 1206 as virtual memory. A specific mass storage device such as a CD-ROM 1214 may also pass data uni-directionally to the CPU.

CPU 1202 may also be coupled to an interface 1210 that connects to one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 1202 optionally may be coupled to an external device such as a database or a computer or telecommunications network using an external connection as shown generally at 1212. With such a connection, it is contemplated that the CPU might receive information from the network, or might output information to the network in the course of performing the method steps described herein.

Regardless of the system's configuration, it may employ one or more memories or memory modules configured to store data, program instructions for the general-purpose processing operations and/or the inventive techniques described herein. The program instructions may control the operation of an operating system and/or one or more applications, for example. The memory or memories may also be configured to store instructions for performing the disclosed methods, graphical user interfaces to be displayed in association with the disclosed methods, etc.

Because such information and program instructions may be employed to implement the systems/methods described herein, the disclosed embodiments relate to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as optical disks; and hardware devices that are specially configured to store and perform program instructions, such as ROM and RAM. Examples of program instructions include both machine code, such as produced by a compiler, and files containing higher level code that may be executed by the computer using an interpreter.

Computer program instructions with which various embodiments are implemented may be stored in any type of computer-readable media, and may be executed according to a variety of computing models including a client/server model, a peer-to-peer model, on a stand-alone computing device, or according to a distributed computing model in which various of the functionalities described herein may be effected or employed at different locations.

The disclosed techniques may be implemented in any suitable combination of software and/or hardware system, such as a web-based server or desktop computer system. Moreover, a system implementing various embodiments may include a portable device, such as a laptop or cell phone. An apparatus and/or web browser may be specially constructed for the required purposes, or it may be a general-purpose computer selectively activated or reconfigured by a computer program and/or data structure stored in the computer. The processes presented herein are not inherently related to any particular computer or other apparatus. In particular, various general-purpose machines may be used with programs written in accordance with the teachings herein, or it may be more convenient to construct a more specialized apparatus to perform the disclosed method steps.

Although the foregoing embodiments have been described in some detail for purposes of clarity of understanding, it will be apparent that certain changes and modifications may be practiced within the scope of the appended claims. Therefore, the present embodiments are to be considered as illustrative and not restrictive and the embodiments are not to be limited to the details given herein, but may be modified within the scope and equivalents of the appended claims.

What is claimed is:

1. A method, comprising receiving a user password in relation to a user identifier, wherein the user identifier and user password are associated with a user account;
   receiving a request to opt-in to use of system-generated passwords instead of the user password;
   receiving a password request;
   generating, by a processor, a substitute password for the user account, wherein the substitute password is a temporary password that is valid for a particular period of time;
   providing the substitute password;
   receiving the substitute password in relation to the user identifier; and
   providing access to the user account in response to receiving the substitute password according to whether the substitute password is received within the particular period of time.

2. The method as recited in claim 1, wherein the user account is associated with a web site, and wherein the user password and request are received via a web page of the web site.

3. The method as recited in claim 1, wherein the substitute password is a temporary password that is valid for a particular period of time such that the temporary password is no longer valid after expiration of the period of time.

4. The method as recited in claim 1, further comprising:
wherein generating the substitute password is performed in response to receiving the password request.

5. The method as recited in claim 1, further comprising:
verifying that the password request has been received from an owner of the user account;
wherein at least one of generating or providing the substitute password is performed after verifying that the password request has been received from the owner of the user account.

6. The method as recited in claim 1, further comprising:
determining a likelihood that the password request was received from an owner of the user account;
wherein generating the substitute password is performed based, at least in part, on a likelihood that the password request was received from an owner of the user account.

7. The method as recited in claim 1, further comprising:
updating information pertaining to the user account such that the user account is not accessible via the user password.

8. The method of claim 1, further comprising:
updating user account information associated with the user account to include an indication that an owner of the user account has opted-in to the use of on demand password services that provide system-generated passwords.

9. A method, comprising
receiving a user password in relation to a user identifier, wherein the user identifier and user password are associated with a user account;
receiving a request to opt-in to use of system-generated passwords instead of the user password;
updating account information pertaining to the user account such that the user password cannot be used to log in to the user account;
generating, by a processor, a substitute password for the user account, wherein the substitute password is a temporary password that is valid for a particular period of time;
providing the substitute password;
receiving the substitute password in relation to the user identifier; and
providing access to the user account in response to receiving the substitute password according to whether the substitute password is received within the particular period of time.

10. The method as recited in claim 9, further comprising:
receiving a password request;
wherein the substitute password is provided in response to the password request.

11. The method as recited in claim 9, further comprising:
transmitting a notification message pertaining to the request; and
receiving a confirmation pertaining to the notification message;
wherein updating the account information is performed in response to receiving the confirmation.

12. The method as recited in claim 9, further comprising:
receiving a request to opt-out of the use of system-generated passwords; and
updating the account information pertaining to the user account such that the user password can be used to log in to the user account.

13. The method of claim 12, further comprising:
updating the account information to include an indication that the owner of the user account has opted-out of the use of on demand password services that provide system-generated passwords.

14. The method of claim 9, wherein the account information is updated to include an indication that an owner of the user account has opted-in to the use of on demand password services that provide system-generated passwords.

15. An apparatus, comprising:
a processor; and
a memory, at least one of the processor or the memory being configured to:
receive a user password in relation to a user identifier, wherein the user identifier and user password are associated with a user account;
receive a request to opt-in to use of system-generated passwords instead of the user password;
generate a substitute password for the user account, wherein the substitute password is a temporary password that is valid for a particular period of time;
provide the substitute password;
receive the substitute password; and
provide access to the user account in response to receiving the substitute password according to whether the substitute password is received within the particular period of time.

16. The apparatus as recited in claim 15, wherein the user account is associated with a web site, and wherein the user password and request are received via a web page of the web site.

17. The apparatus as recited in claim 15, wherein the substitute password is a temporary password that is valid for a particular period of time such that the temporary password is no longer valid after expiration of the period of time.

18. The apparatus as recited in claim 15, at least one of the processor or the memory being further configured to:
receive a password request in association with the user account;
wherein generating the substitute password is performed in response to receiving the password request.

19. The apparatus as recited in claim 15, at least one of the processor or the memory being further configured to:
receive a password request; and
verify that the password request has been received from an owner of the user account;
wherein at least one of generating or providing the substitute password is performed after verifying that the password request has been received from the owner of the user account.

20. The apparatus as recited in claim 15, at least one of the processor or the memory being further configured to:
receive a password request from a client device;
determine a likelihood that the password request was received from an owner of the user account;
wherein generating the substitute password is performed based, at least in part, on a likelihood that the password request was received from an owner of the user account.

21. The apparatus as recited in claim 15, at least one of the processor or the memory being further configured to:
update information pertaining to the user account such that the user account is not accessible via the user password.

* * * * *